(12) United States Patent
Glenn

(10) Patent No.: US 7,109,607 B2
(45) Date of Patent: *Sep. 19, 2006

(54) SYSTEM TO VARY CAPACITANCE BASED ON A CONTROL SIGNAL

(75) Inventor: Robert C. Glenn, Bend, OR (US)

(73) Assignee: Intel Corporation, Santa Clara, CA (US)

(*) Notice: Subject to any disclaimer, the term of this patent is extended or adjusted under 35 U.S.C. 154(b) by 422 days.

This patent is subject to a terminal disclaimer.

(21) Appl. No.: 10/601,509

(22) Filed: Jun. 23, 2003

(65) Prior Publication Data

US 2004/0256917 A1    Dec. 23, 2004

(51) Int. Cl.
*H02M 3/06* (2006.01)

(52) U.S. Cl. ...................................... 307/109

(58) Field of Classification Search ................ 307/109, 307/110
See application file for complete search history.

(56) References Cited

U.S. PATENT DOCUMENTS

| | | | | |
|---|---|---|---|---|
| 4,259,746 A | * | 3/1981 | Sandstedt | 398/115 |
| 5,332,997 A | * | 7/1994 | Dingwall et al. | 341/150 |
| 5,600,187 A | * | 2/1997 | El-Hamamsy et al. | 307/157 |
| 5,960,898 A | * | 10/1999 | Okada et al. | 180/65.8 |
| 6,137,372 A | * | 10/2000 | Welland | 331/117 R |
| 6,574,288 B1 | * | 6/2003 | Welland et al. | 375/327 |
| 6,882,064 B1 | * | 4/2005 | Glenn | 307/109 |

* cited by examiner

*Primary Examiner*—Lynn Feild
*Assistant Examiner*—Michael Rutland-wallis
(74) *Attorney, Agent, or Firm*—Buckley, Maschoff & Talwalker LLC

(57) ABSTRACT

Some embodiments provide a plurality of capacitors coupled in parallel and a plurality of capacitor switches, each one of the capacitor switches coupled in series with a respective one of the plurality of capacitors. Also provided may be a plurality of control circuits, each of the plurality of control circuits coupled to a respective one of the plurality of capacitor switches, to generate a respective control voltage, and to independently set a respective one of the plurality of capacitor switches to the respective control voltage, and a plurality of control switches, each of the plurality of control switches to couple and to decouple a respective one of the plurality of control circuits to and from a control signal.

14 Claims, 7 Drawing Sheets

SYSTEM TO VARY CAPACITANCE BASED ON A CONTROL SIGNAL

BACKGROUND

A circuit may vary the effective capacitance of a circuit element in response to a control signal. According to one example, a voltage-controlled oscillator (VCO) may vary the effective capacitance of an internal element in response to a signal that indicates a desired output frequency of the VCO. The output frequency then changes in response to the changed capacitance. In the case of a VCO, it is often difficult to vary an effective capacitance of the internal element to an extent required to produce a desired range of output frequencies. Some VCOs attempt to address this difficulty by switching in additional or alternative capacitive elements when needed. The additional or alternative capacitive elements may change a "center" frequency of the VCO, and may therefore increase the tuning range thereof.

The foregoing technique may cause a jump in the output frequency of the VCO. Accordingly, additional or alternative capacitive elements are usually coupled selectively to a VCO prior to operation of the VCO. This coupling may be based on a stored control word that indicates a desired center frequency of the VCO. The output frequency of the VCO is then fine-tuned during operation by varying the capacitance of a single circuit element.

DETAILED DESCRIPTION

Figure 1:
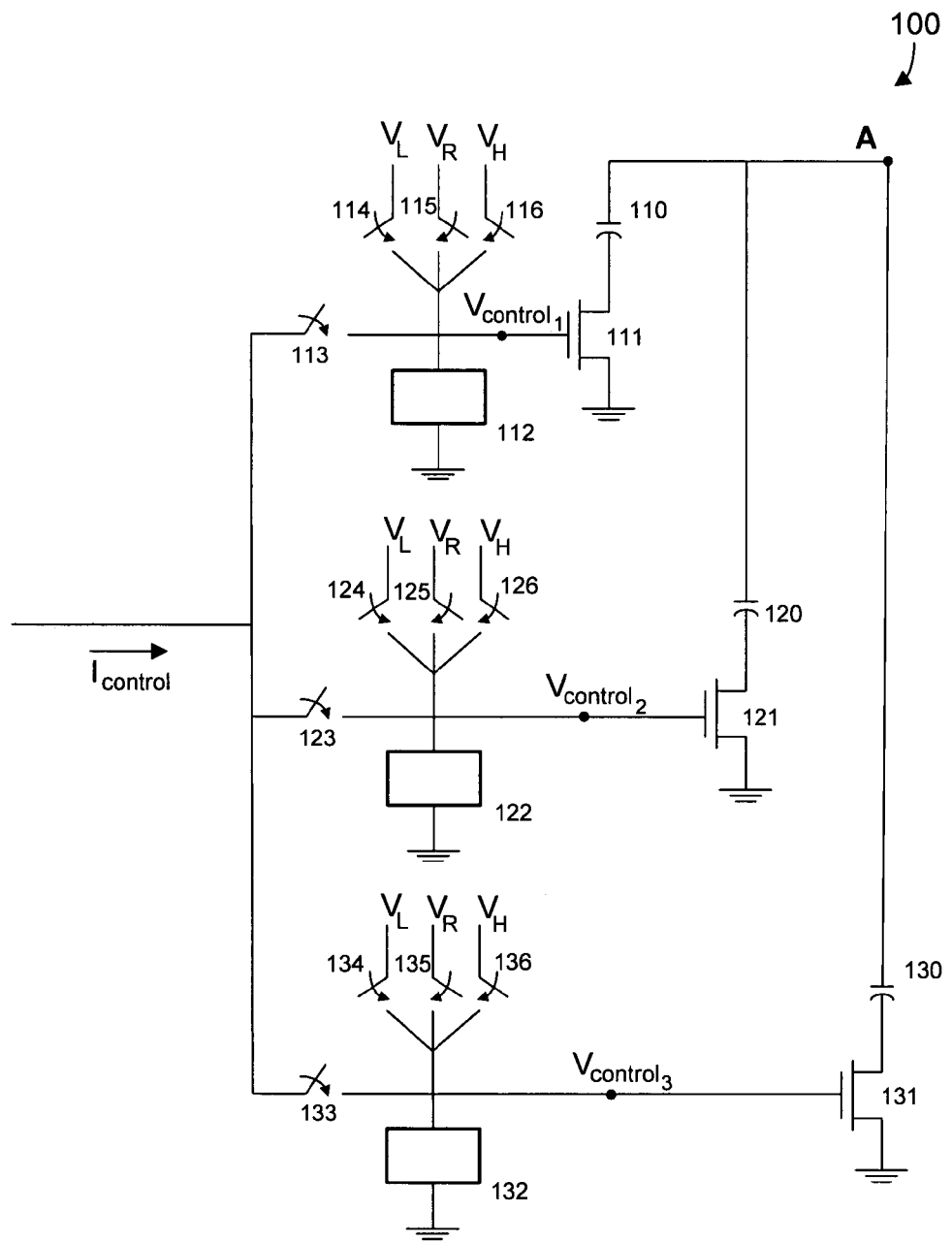
FIG. 1 is a schematic diagram of a circuit according to some embodiments.

FIG. 1 is a schematic diagram of circuit 100 according to some embodiments. Circuit 100 includes capacitors 110, 120 and 130 coupled in parallel. Although capacitors 110, 120 and 130 are illustrated as single capacitors, some embodiments of capacitors 110, 120 and 130 include one or more active and/or passive elements that provide a particular characteristic capacitance. In this regard, capacitors 110, 120 and 130 of FIG. 1 may represent the particular characteristic capacitance of the one or more elements.

Capacitors 110, 120 and 130 are coupled in series to respective ones of capacitor switches 111, 121 and 131. Capacitor switches 111, 121 and 131 each may comprise a complementary metal-oxide semiconductor (CMOS) transistor, however capacitor switches 111, 121 and 131 are not limited thereto. In a case that one of capacitor switches 111, 121 and 131 is completely "closed" (i.e., its gate voltage results in a minimum drain-to-source resistance), current may flow substantially freely from a respective capacitor to ground. The respective capacitor therefore contributes substantially its entire characteristic capacitance to the total capacitance of capacitors 110, 120 and 130.

One of capacitor switches 111, 121 and 131 is "open" if its gate voltage prevents substantially any current from flowing to ground from a respective capacitor. In such a case, the respective capacitor contributes negligibly to the total capacitance of capacitors 110, 120 and 130. Therefore, as the resistance provided by a capacitor switch decreases, an increased percentage of a respective capacitor's characteristic capacitance is contributed to the total capacitance. In some embodiments, the quality factor ("Q") of the contributed capacitance also increases as the capacitor switch resistance decreases.

The total capacitance may equal the sum at node A of the effective capacitances contributed by each capacitor 110, 120 and 130. The total capacitance may be contributed to another circuit that is coupled to circuit 100 at node A. In this regard, node A may be coupled to a VCO having an output frequency that is based at least in part on the capacitance provided at node A. The output frequency may therefore be changed by changing the total capacitance provided at node A. In some embodiments, the total capacitance provided at node A may be changed without significantly changing the Q of the VCO.

Capacitor switches 120, 121 and 122 are coupled to respective ones of control circuits 112, 122 and 132. Each of control circuits 112, 122 and 132 may generate a respective control voltage ($V_{control}$), and may comprise a loop filter of a phase-locked loop (PLL) or any other circuit to generate a control voltage. Each of control circuits 112, 122 and 132 may set a respective capacitor switch to the generated control voltage.

The respective control voltage determines a source-to-drain resistance of a respective capacitor switch. The control voltage therefore determines an effective capacitance of a respective capacitor that is contributed to the total capacitance at node A. More particularly, the resistance provided by a capacitor switch decreases as its control voltage increases, and, as a result, an increased percentage of its respective capacitor's characteristic capacitance is contributed to the total capacitance.

Each of control circuits 112, 122 and 132 may be coupled to a respective one of control switches 113, 123 and 133. Each of control switches 113, 123 and 133 may couple and decouple a respective control circuit to a control signal. Control circuits 112, 122 and 132 may generate a respective control voltage based at least on a control signal ($I_{control}$). As will be described in more detail below, the control signal may be generated by a charge pump. For example, the charge pump may source current to one of control circuits 112, 122 and 132 via a respective one of control switches 113, 123 and 133 in order to increase an effective capacitance at node A. The charge pump may alternatively, sink current from one of control circuits 112, 122 and 132 via a respective one of control switches 113, 123 and 133 in order to decrease an effective capacitance at node A.

A set of biasing circuits is coupled to each control circuit 112, 122 and 132 in order to set a respective control voltage to a reset voltage, a first threshold voltage, and a second threshold voltage. For example, biasing circuit 114 may set control voltage $V_{control1}$ to a first threshold voltage $V_L$, biasing circuit 115 may set control voltage $V_{control1}$ to a reset voltage $V_R$, and biasing circuit 116 may set control voltage $V_{control1}$ to a second threshold voltage $V_H$. In the present example, the voltages serve to change a series resistance between capacitor 110 and ground. As described above, a change in the resistance between capacitor 110 and ground changes an amount of the characteristic capacitance of capacitor 110 that is contributed to the total capacitance at node A.

According to some embodiments, the first threshold voltage "opens" capacitor switch 111. The first threshold voltage therefore causes capacitor 110 to contribute negligibly to the total capacitance at node A. The second threshold voltage "closes" capacitor switch 111, resulting in substantially all the characteristic capacitance of capacitor 110 to be contributed to the total capacitance.

The reset voltage may be a voltage that causes capacitor switch 111 to present capacitor 110 with a resistance between 0 and infinity. This resistance may be in the middle of the resistive range of capacitor switch 111. In some embodiments, the first threshold voltage is a voltage at which any further decrease in $V_{control1}$ would not increase a resistance of capacitor switch 111, the second threshold voltage is a voltage at which any further increase in $V_{Control1}$ would not decrease a resistance of capacitor switch 111, and the reset voltage is equal to a voltage between the first and second threshold voltages, such as an average of the first and second voltages.

Biasing circuits 124, 125 and 126 are coupled to capacitor switch 121. In addition, biasing circuits 134, 135 and 136 are coupled to capacitor switch 131. Relationships between these biasing circuits and capacitor switches may be similar to those described with respect to switch 111 and circuits 114 through 116.

Although they are similarly illustrated, at least two of control circuits 112, 122 and 132 are different from one another in some embodiments. In some of these embodiments, the at least two control circuits may generate different control voltages in response to a same input control signal. The illustrated capacitors, capacitor switches, biasing circuits and control switches also need not be identical according to some embodiments.

Figure 2:
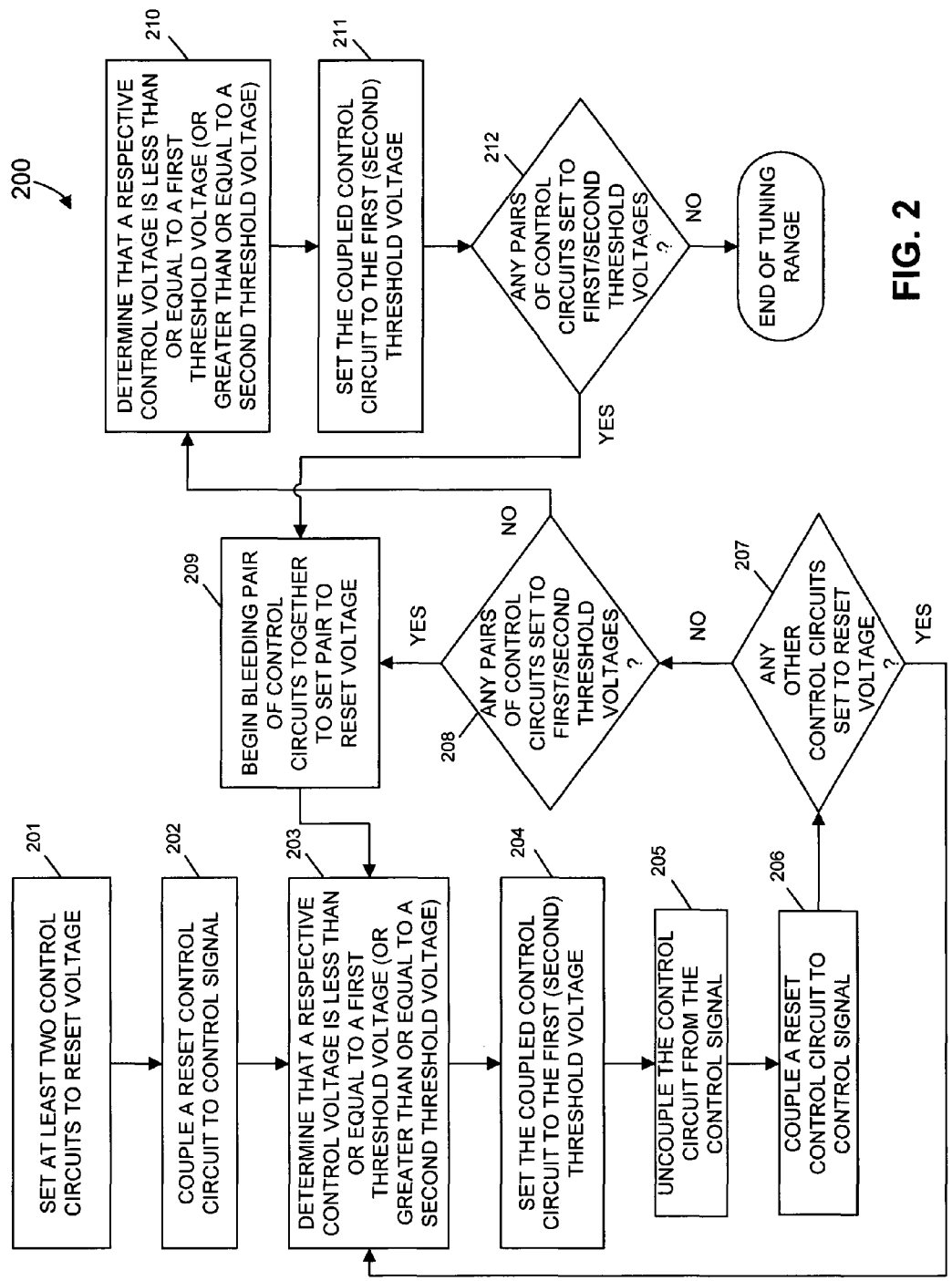
FIG. 2 is a flow diagram of a process according to some embodiments.

FIG. 2 is a flow diagram of process 200 according to some embodiments. Process 200 may change a capacitance of circuit 100 at node A in response to a control signal. Process 200 may be executed by a digital state machine and/or other hardware and software coupled to circuit 100.

At 201, at least two of control circuits 112, 122 and 132 are set to the reset voltage $V_R$. In the illustrated example, biasing circuits 115 and 125 are respectively coupled to control circuits 112 and 122, and biasing circuit 134 is coupled to control circuit 132. The terms "couple" and "decouple" as used herein may refer to the creation and destruction of electrical connections between two elements and/or between an element and a signal. In an alternative example, biasing circuit 115 may always be in electrical communication with control circuit 112, but may be selectively activated in order to "couple" biasing circuit 115 to control circuit 112 and to therefore set control circuit 112 to the reset voltage.

In some embodiments, all control circuits are set to the reset voltage at 201. The resulting Q of the capacitance that is contributed to node A may be low because the effective series resistance of each associated capacitor is substantial. Accordingly, in some embodiments, two control circuits are set to the reset voltage, half of the remaining control circuits are set to the first threshold voltage, and the other half of the remaining control circuits are set to the second threshold voltage. The effective capacitance contributed to node A in such embodiments may be substantially identical to that contributed by the previously-described embodiments, but the Q of the contributed capacitance may be significantly greater. In this regard, capacitors associated with control circuits that are set to the second threshold voltage contribute high Q capacitances to node A and capacitors associated with control circuits that are set to the first threshold voltage contribute very little capacitance and therefore very little to the Q at node A.

One of the control circuits set to the reset voltage is coupled to control signal $I_{control}$ at 202. Control circuit 112 may be coupled to control signal $I_{control}$ at 202 by closing control switch 113. Biasing circuit 115 is then uncoupled from control circuit 112 prior to 203. Next, control circuit 112 receives the control signal $I_{control}$ and control voltage $V_{control1}$ changes based on a response of control circuit 112 to control signal $I_{control}$.

Capacitor switch 111 is coupled to control voltage $V_{control1}$ by virtue of its coupling to control circuit 112. A resistance of capacitor switch 111 may therefore change in response to a change in control voltage $V_{control1}$. The change in resistance changes an amount of the characteristic capacitance of capacitor 110 that contributes to the total capacitance of capacitors 110, 120 and 130 at node A. Therefore, a change in control voltage $V_{control1}$ may cause a change in the effective capacitance at node A.

According to one example, control signal $I_{control1}$ causes control voltage $V_{control1}$ to decrease after 202. This decrease may increase a resistance of capacitor switch 111 and cause capacitor 110 to contribute less and less of its characteristic capacitance to node A. A comparator (not shown) may determine at 203 that control voltage $V_{control1}$ has decreased below the first threshold voltage $V_L$. Control circuit 112 is therefore set to the first threshold voltage $V_L$ by coupling biasing circuit 114 thereto at 204. Control circuit 112 may also be decoupled from control signal $I_{control}$ at 205 by opening control switch 113.

Alternatively, $V_{control1}$ may increase under the influence of $I_{control1}$ at 203. In some embodiments, the increase in $V_{control1}$ decreases a resistance of capacitor switch 111 and thereby causes capacitor 110 to contribute increasing amounts of its characteristic capacitance to node A. It may eventually be determined at 203 that $V_{control1}$ is greater than or equal to the second threshold voltage $V_H$. Control circuit 112 is therefore set to the second threshold voltage ($V_H$) at 204 by biasing circuit 116.

Next, a control circuit that is set to the reset voltage is coupled to control signal $I_{control}$ at 206. At least one control circuit will initially be available for coupling to control signal $I_{control}$ at 206 because at least two control circuits were set to the reset voltage at 201. In the present example, control circuit 122 is coupled to control signal $I_{control}$ at 206. It is then determined at 207 whether any control circuits other than control circuit 122 are set to the reset voltage. If so, flow returns to 203. If no other control circuits are set to the reset voltage, flow proceeds to 208.

At 208, it is determined whether any pair of control circuits exist in which one of the control circuits is set to the first threshold voltage and the other control circuit is set to the second threshold voltage. If so, the biasing voltages may be bled together at 209 using external circuitry in order to set each of the pair of control circuits to the reset voltage. The effective capacitance contributed by the capacitors associated with the pair will be substantially the same before and after 209. Flow returns to 203 from 209 and proceeds as described above.

In a case the determination at 208 is negative, then all control circuits other than the control circuit coupled to control signal $I_{control}$ at 206 are set to one of the first or second threshold voltages. Flow therefore continues through 210 and 211 as described above with respect to 203 and 204.

Next, at 212, it is again determined whether any pair of control circuits exist in which one of the control circuits is set to the first threshold voltage and the other control circuit is set to the second threshold voltage.

The determination at 212 is positive if the coupled control circuit was set at 211 to a threshold voltage that differs from the threshold voltage to which each other control circuit is set. As a result, flow returns to 209 to bleed the coupled control circuit together with another control circuit.

If the determination at 212 is negative, then all control circuits are set to one of the first or second threshold voltages. Circuit 100 has therefore reached the end of its tuning range and process 200 terminates.

According to some embodiments, elements 208 through 212 of process 200 are omitted, and an end of the tuning range is reached if the determination at 207 is negative. In some of these embodiments, 208 and 209 are executed continuously during process 200. For example, circuit 100 is monitored while process 200 executes to determine whether any control circuits are coupled to the reset voltage. If none are, then 208 and 209 are executed as described above. The determination at 207 will therefore be positive so long as all of the control circuits are not set to one of the first threshold voltage and the second threshold voltage.

Process 200 may be used to vary a capacitance at node A based on the control voltage. Although the above-described embodiment increases the node A capacitance in response to an increasing control voltage, some embodiments decrease the node A capacitance in response to an increasing control voltage.

Figure 3:
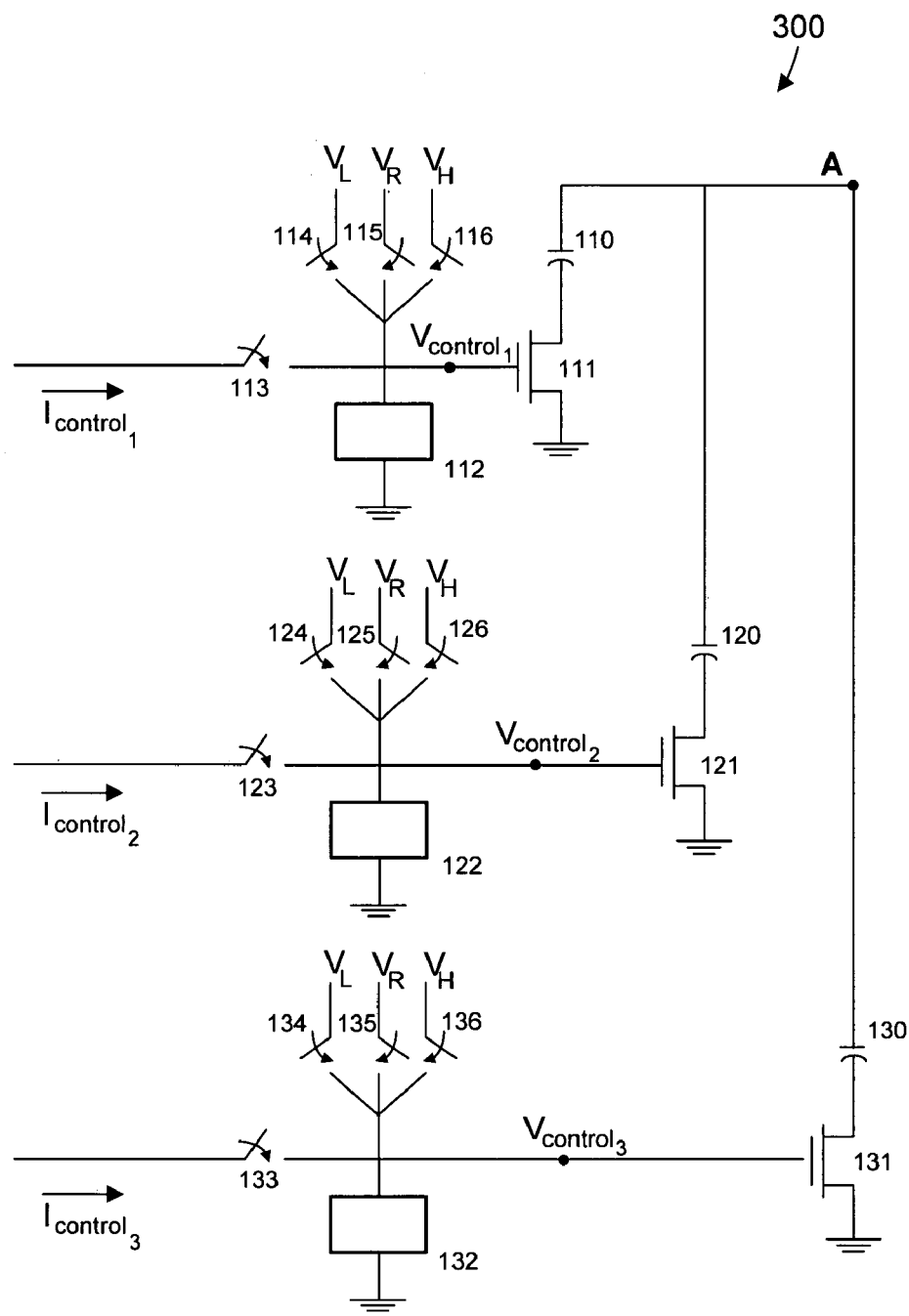
FIG. 3 is a schematic diagram of a circuit according to some embodiments.

FIG. 3 is a schematic diagram of circuit 300 according to some embodiments. Circuit 300 is identical to circuit 100 except for the coupling of each control switch 113, 123 and 133 to a respective one of control signals $I_{control1}$, $I_{control2}$, and $I_{control3}$. Accordingly, each of control signals $I_{control1}$, $I_{control2}$, and $I_{control3}$ may sink or source current from or to a respective one of control circuits 112, 122 and 132.

Two or more of control signals $I_{control1}$, $I_{control2}$, and $I_{control3}$ may be different from one another, and may be generated by two or more charge pumps. In this regard, the two or more charge pumps may be different from one another and may therefore generate different control signals based on a same difference signal that is received from a detector. The different control signals may also be generated based on difference signals received from different detectors. A detector and a difference signal according to some embodiments are described below. Circuit 300 may be operated as described above with respect to process 200.

Figure 4:
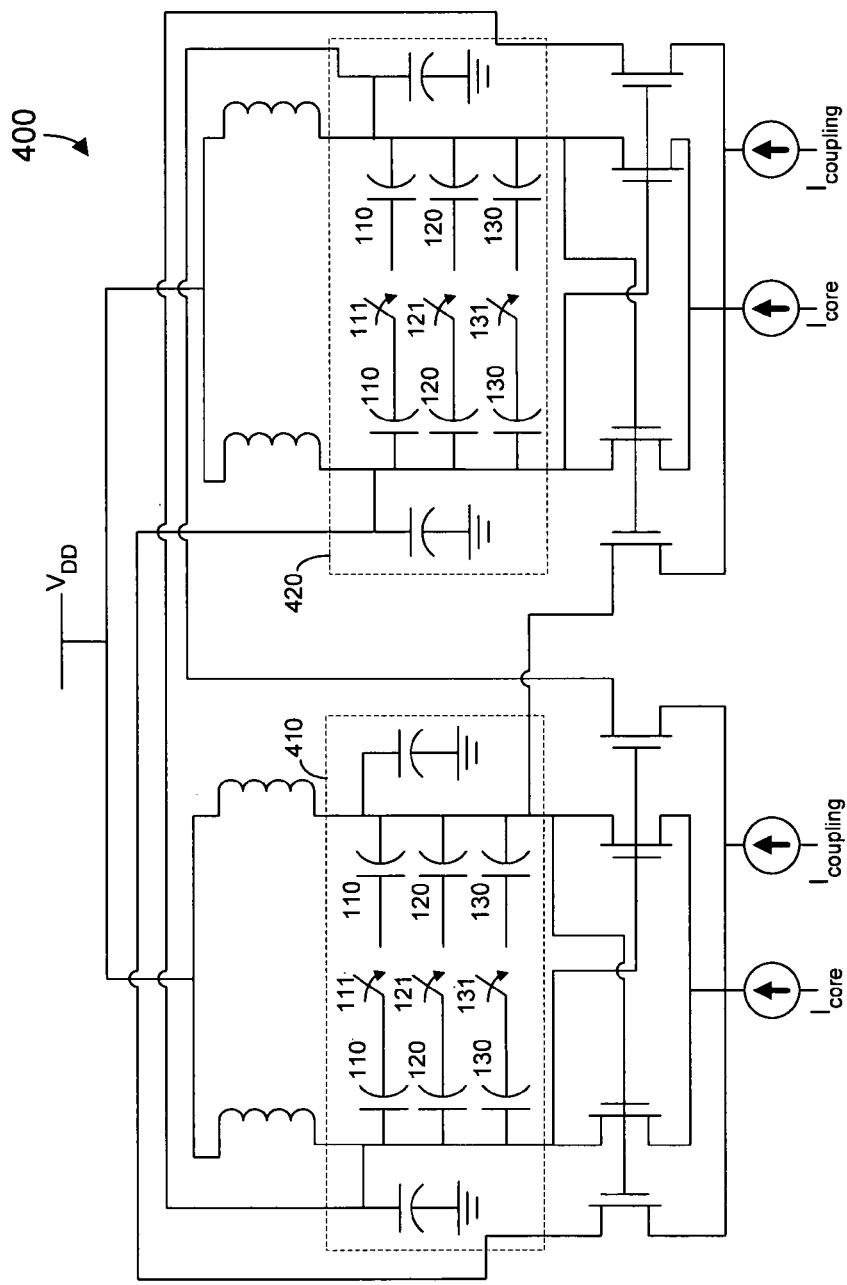
FIG. 4 is a schematic diagram of a VCO according to some embodiments.

FIG. 4 is a schematic diagram of VCO 400 that may be used in conjunction with some embodiments. VCO 400 is a differential-mode LC tank-based VCO known to those of ordinary skill. An output frequency of oscillation of VCO 400 is based at least on output-controlling capacitances 410 and 420. Output-controlling capacitances 410 and 420 include capacitors 110, 120 and 130 and respective capacitor switches 111, 121 and 131. In contrast to the single-ended embodiment of FIG. 1, capacitors 110, 120 and 130 are shown in a differential-mode configuration in FIG. 4. As described with respect to FIGS. 1 and 2, capacitors 110, 120 and 130 of FIG. 4 provide capacitance to VCO 400 based on voltage-controlled series resistances of capacitor switches 111, 121 and 131.

The output frequency of VCO 400 is also based on $I_{core}$ and $I_{coupling}$. $I_{core}$ and $I_{coupling}$ are received from a voltage-to-current converter (not shown) that receives a control voltage from an associated control circuit. The associated control circuit may be one of control circuits 112, 122 and 132 or an unshown control circuit. $I_{core}$ and $I_{coupling}$ are therefore based on the received control voltage. According to some embodiments, the output frequency of VCO 400 is alternatively or additionally based on a capacitive element such as a varactor or variable capacitor that provides a capacitance based on a control voltage.

In the operation of some embodiments, $I_{core}$ and $I_{coupling}$ (and/or a capacitance of the aforementioned capacitive element) are initially fixed by uncoupling the voltage-to-current converter (and/or from the capacitive element) from its associated control circuit and by inputting a voltage to the voltage-to-current converter (and/or to the capacitive element). The voltage may be a voltage that is suitable to fix the signals (and/or capacitance) to a midpoint within their operational range. Next, process 200 may be executed until an output frequency of VCO 400 equals a reference value. Control voltages $V_{control1}$, $V_{control2}$, and $V_{control3}$ may then be held at their existing levels while the associated control circuit is coupled to the voltage-to-current converter (and/or to the capacitive element) in order to fine-tune the output frequency.

Figure 5:
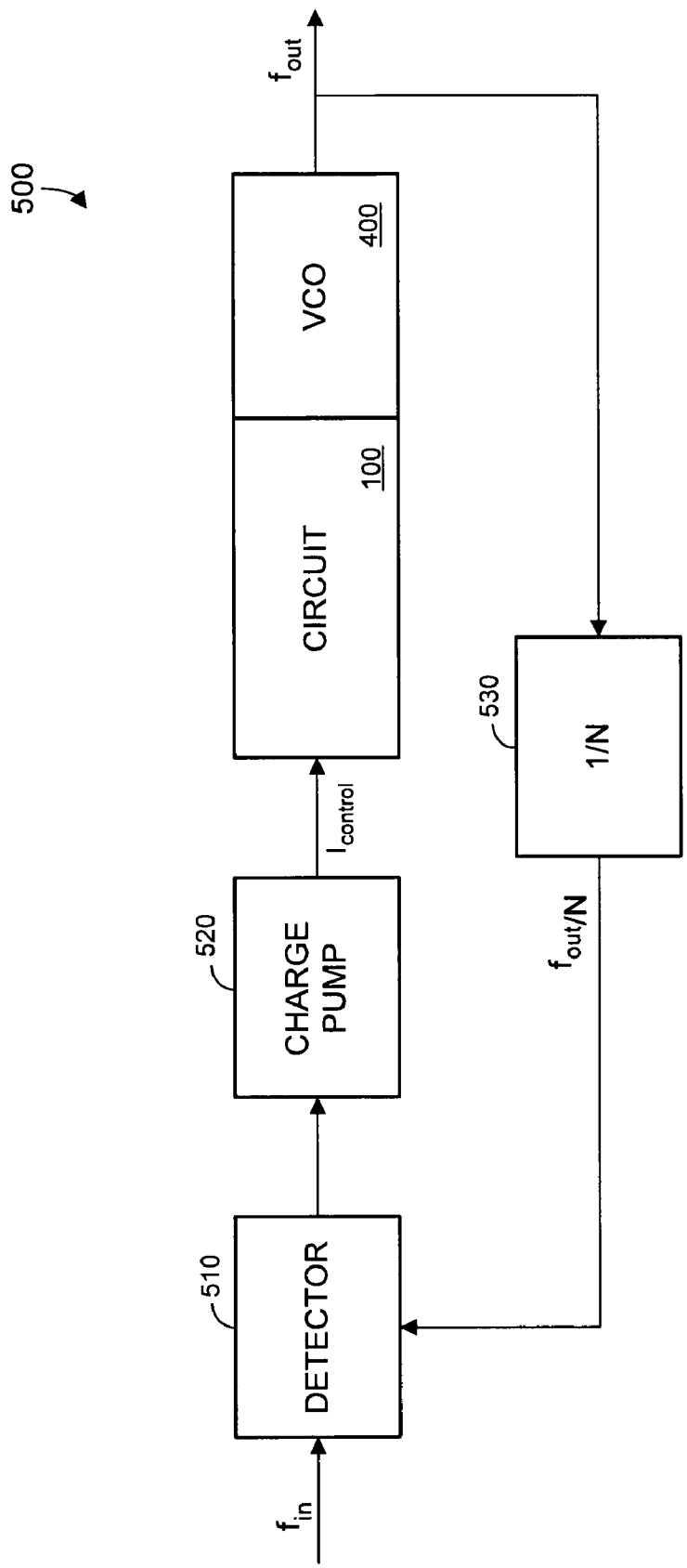
FIG. 5 is a block diagram of a phase-locked loop according to some embodiments.

FIG. 5 is a block diagram of PLL 500 according to some embodiments. PLL 500 includes VCO 400, which is coupled to circuit 100 of FIG. 1 as described above. Also included in PLL 500 are detector 510, charge pump 520, and feedback divider 530. PLL 500 may be used to generate a output signal $f_{out}$ that is equal to $N(f_{in})$.

In operation, input signal $f_{in}$ is received by detector 510. Detector 510 also receives the signal $f_{out}/N$ from feedback divider 540. Detector 510 determines a difference between the frequency or phase of the two received signals and generates a difference signal that indicates the determined difference. Detector 510 transmits the difference signal to charge pump 520, which generates a control signal based on the difference signal. The control signal, which may be represented by $I_{control}$ in FIG. 1, is transmitted to circuit 100.

Circuit 100 may operate as described above to vary a capacitance at node A based on $I_{control}$. This capacitance affects an output-controlling capacitance of VCO 400, which in turn determines a frequency or phase of the output signal $f_{out}$. As described above, VCO 400 may also receive a control voltage from one of control circuits 112, 122 and 132 or from another control circuit such as a loop filter. The received control voltage may control $I_{core}$ and $I_{coupling}$, or a capacitive element to vary a frequency or phase of the output signal $f_{out}$. Divider 530 divides the frequency or phase of the output signal by N prior to transmitting the divided signal to detector 510.

In some embodiments, charge pump 520 sources current to circuit 100 if $f_{out}/N$ is greater than $f_{in}$. Circuit 100 adds capacitance to the output-controlling capacitance of VCO 400 in response to the sourced current. This additional capacitance reduces the frequency or phase of $f_{out}$, and thereby also reduces the frequency or phase of $f_{out}/N$ Charge pump 520 may sink current from loop filter 530 if $f_{out}/N$ is less than $f_{in}$, resulting in an increase in the frequency or phase of $f_{out}/N$ These processes eventually result in $f_{out}/N=f_{in}$, or $f_{out}=N(f_{in})$.

Figure 6:
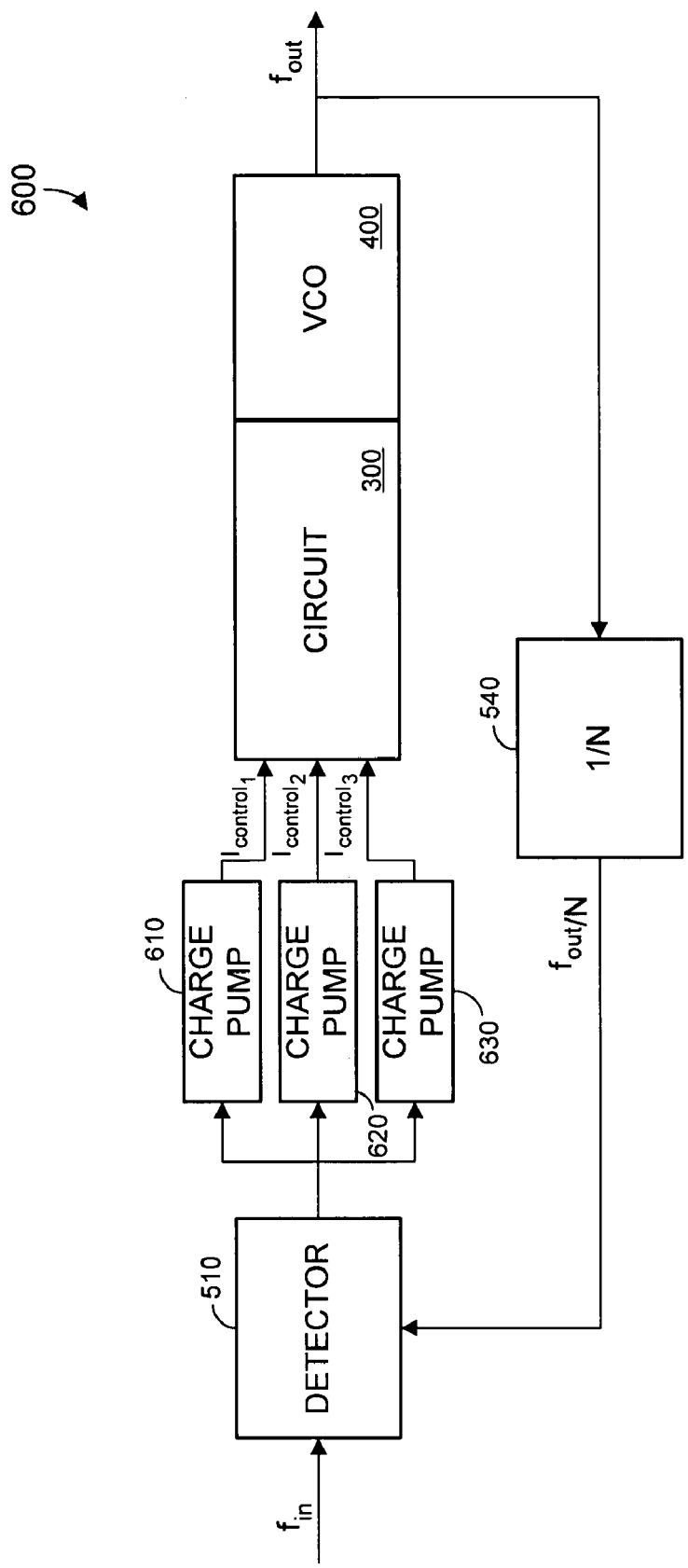
FIG. 6 is a block diagram of a phase-locked loop according to some embodiments.

FIG. 6 is a block diagram illustrating a variation of PLL 500. PLL 600 shows a plurality of charge pumps 610 through 630, each of which receives the difference signal from detector 510 and transmits a respective control signal to circuit 300. Two or more of charge pumps 610 through 630 may differ from one another. In this regard, the two or more different charge pumps may generate different control signals in response to an identical difference signal.

Figure 7:
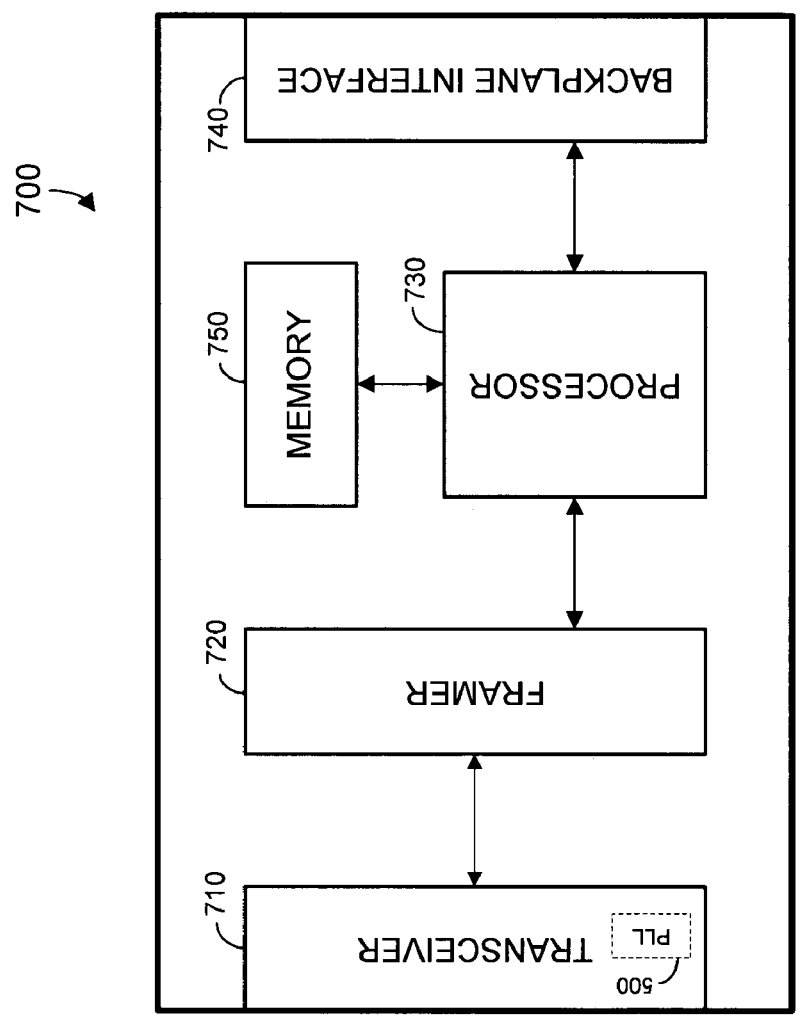
FIG. 7 is a block diagram of a line card according to some embodiments.

FIG. 7 is a block diagram of line card 700 according to some embodiments. Line card 700 may provide an interface between a main backplane and an optical network. Line card 700 may comprise a circuit board onto which the illustrated elements are mounted. The elements include transceiver 710, framer 720, processor 730, backplane interface 740, and memory 750.

Transceiver 710 may be an optical transceiver including elements for transmitting and receiving data over an optical physical layer. A transmitting section of transceiver 710 may comprise PLL 500 including VCO 400 and circuit 100. A receiving section may include a Clock and Data Recovery Unit that also incorporates VCO 400 and circuit 100. Transceiver 710 may also comprise a serial/deserializer to process outgoing/incoming data.

Framer 720 may receive and decapsulate encapsulated data that is received by the receiving section of transceiver 710. Framer 720 may also encapsulate data received from processor 730 prior to transmitting the encapsulated to transceiver 720. Processor 730 receives/transmits data from/ to backplane interface 740, which communicates with a network server or a network switch backplane. Memory 750 is in communication with processor 730 and may comprise a Double Data rate Random Access Memory, a Quad Data rate Random Access Memory, or any other suitable memory. Memory 750 may store code executable by processor 730 and/or other data for use by processor 730.

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

For example, some embodiments may be used in conjunction with any suitable VCO. The output-controlling capacitances of such VCOs may be configured within an RC ring oscillator, an LC tank, an RC tank, or any other type of circuit. Some embodiments provide capacitances that may be switched in and out of a circuit gradually so as to minimize their effect on circuit behavior and circuit Q.

What is claimed is:

1. A circuit comprising:
a plurality of capacitors coupled in parallel;
a plurality of capacitor switches, each one of the capacitor switches coupled in series with a respective one of the plurality of capacitors;
a plurality of control circuits, each of the plurality of control circuits coupled to a respective one of the plurality of capacitor switches, to generate a respective control voltage, and to independently set a respective one of the plurality of capacitor switches to the respective control voltage;
a plurality of control switches, each of the plurality of control switches to couple and to decouple a respective one of the plurality of control circuits to and from a control signal; and
a plurality of sets of one or more control biasing circuits, each of the plurality of sets of one or more control biasing circuits to set a respective control voltage to one of a reset voltage, a first threshold voltage, and a second threshold voltage.

2. A circuit according to claim 1, further comprising an oscillating circuit coupled to the plurality of capacitors by the plurality of capacitor switches, an output frequency of the oscillating circuit based at least on a capacitance provided to the oscillating circuit by the plurality of capacitors.

3. A circuit according to claim 1, further comprising:
a charge pump, the charge pump to sink or source the control signal from or to the plurality of control circuits, each of the plurality of control circuits to generate the respective control voltage based at least in part on the control signal.

4. A circuit according to claim 3, further comprising:
a detector, the detector to transmit a difference signal to the charge pump, the difference signal to indicate a difference between a reference signal and an output signal, wherein the output signal is based on one or more of the plurality of capacitors, and wherein the charge pump is to generate the control signal based on the difference signal.

5. A circuit according to claim 4, further comprising:
an oscillating circuit coupled to the plurality of capacitors by the plurality of capacitor switches, the oscillating circuit to output the output signal, wherein the output signal is based at least on a capacitance provided to the oscillating circuit by the plurality of capacitors.

6. A circuit according to claim 1, wherein if a particular capacitor switch is set to the first threshold voltage, a particular capacitor coupled iii series with the particular capacitor switch contributes negligibly to a total capacitance of the plurality of capacitors,
wherein if the particular capacitor switch is set to the second threshold voltage, the particular capacitor coupled in series with the particular capacitor switch contributes substantially its characteristic capacitance to the total capacitance of the plurality of capacitors, and
wherein the reset voltage is greater than the first threshold voltage and less than the second threshold voltage.

7. A circuit according to claim 1, wherein at least two of the plurality of control circuits are not identical to each other.

8. A circuit according to claim 7, wherein the at least two of the plurality of control circuits are to generate different control voltages in response to a same control signal.

9. A circuit according to claim 1, further comprising:
a plurality of charge pumps, each of the plurality of charge pumps coupled to a respective one of the plurality of control switches, and to sink or source a respective control signal from or to a respective one of the plurality of control circuits,
wherein each of the plurality of control circuits to generate the respective control voltage based at least in part on the respective control signal.

10. A circuit according to claim 9, further comprising a detector, the detector to transmit a difference signal to the plurality of charge pumps, the difference signal to indicate a difference between a reference signal and an output signal, wherein the output signal is based on one or more of the plurality of capacitors, and wherein at least two of the plurality of charge pumps are to generate different control signals based on the difference signal.

11. A method comprising:
setting a plurality of control circuits and a plurality of capacitor switches to a reset voltage;
coupling a first of the plurality of control circuits to a control signal, the first control circuit coupled in series to a first of the plurality of capacitor switches;
determining that a control voltage of the first control circuit is less than a first threshold voltage, wherein the first threshold voltage is less than the reset voltage;
setting the first control circuit to the first threshold voltage;

uncoupling the first control circuit from the control signal;

coupling a second one of the plurality of control circuits to the control signal;

determining that a control voltage of the second control circuit is greater than a second threshold voltage, wherein the second threshold voltage is greater than the reset voltage;

setting the second control circuit to the second threshold voltage;

uncoupling the second control circuit from the control signal; and coupling a third one of the plurality of control circuits to the control signal.

12. A method according to claim 11, wherein each of the capacitor switches is coupled in series to a respective one of a plurality of capacitors, and wherein a capacitor coupled in series to the first capacitor switch contributes negligibly to a total capacitance of the plurality of capacitors if the first control circuit is set to the first threshold voltage.

13. A method according to claim 12, wherein setting the first control circuit to the first threshold voltage opens the first capacitor switch.

14. A method according to claim 11, wherein setting the second control circuit to the second threshold voltage closes the second capacitor switch.

* * * * *